R. A. HELTON.
VIEW AND FOCUS FINDER.
APPLICATION FILED JAN. 9, 1915.
1,177,622.
Patented Apr. 4, 1916.
2 SHEETS—SHEET 1.
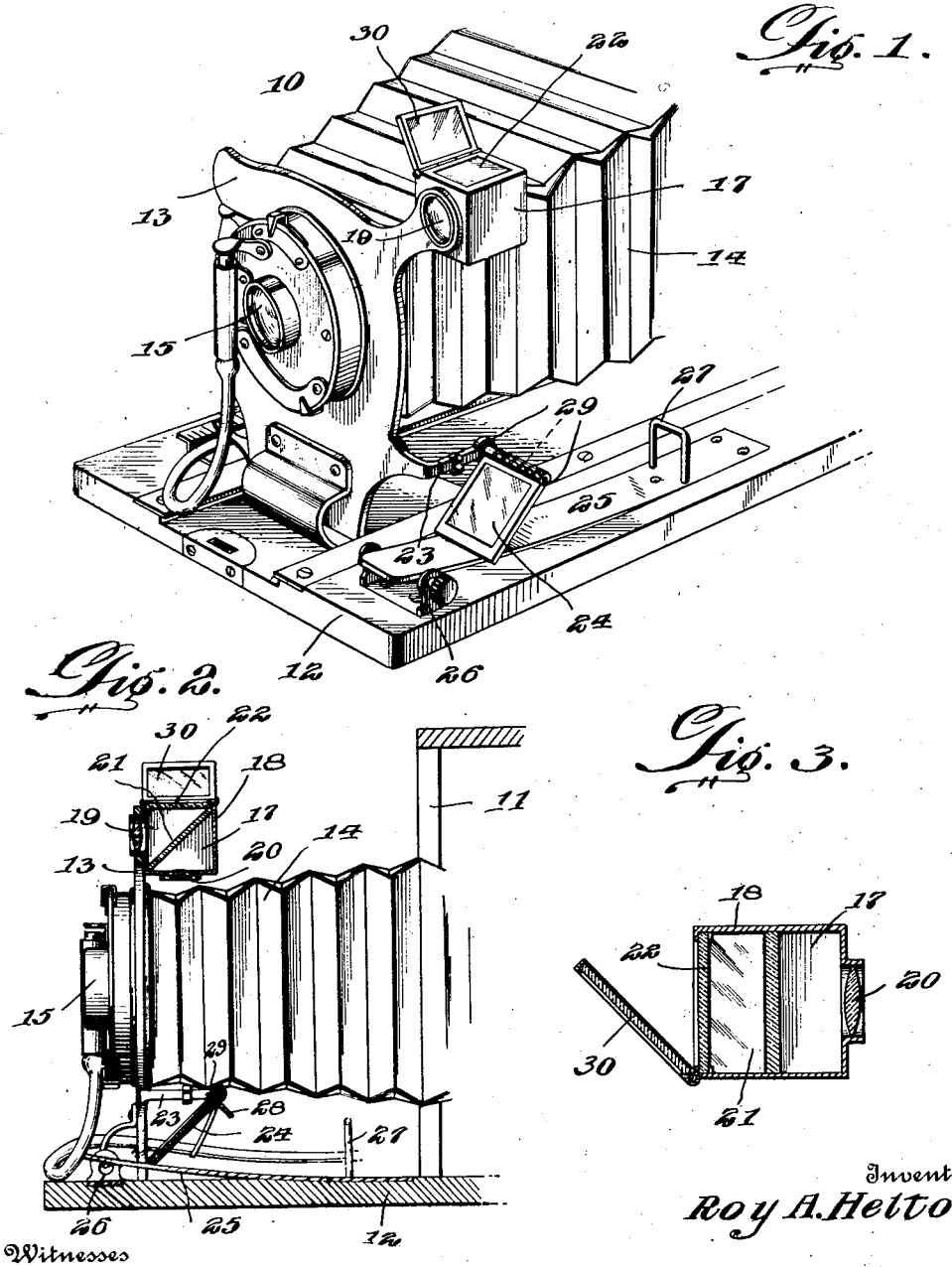
Inventor
Roy A. Helton.
By Victor J. Evans.
Attorney R. A. HELTON.
VIEW AND FOCUS FINDER.
APPLICATION FILED JAN. 9, 1915.
1,177,622.
Patented Apr. 4, 1916.
2 SHEETS—SHEET 2.
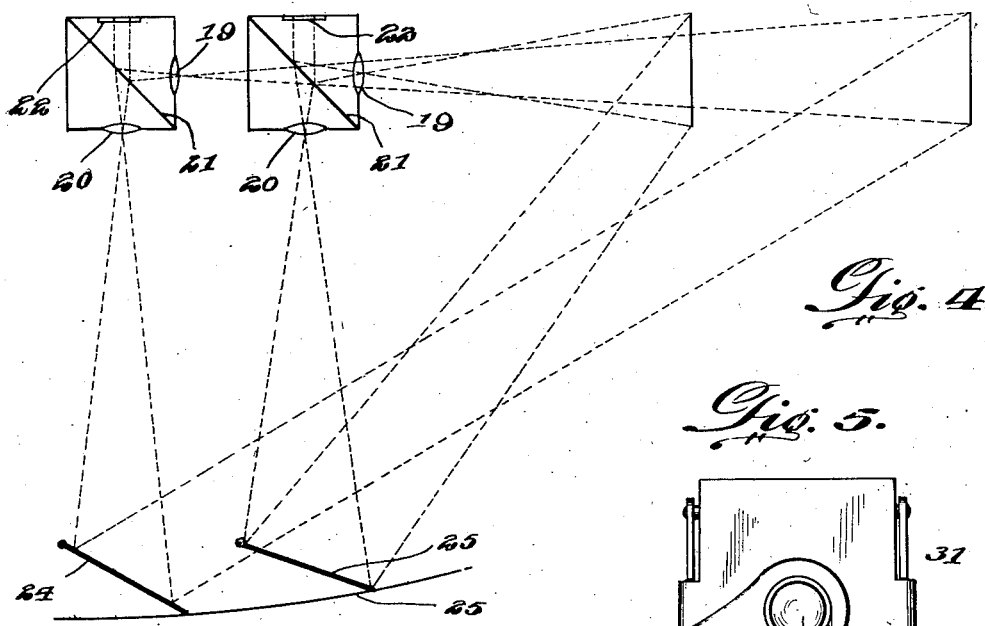
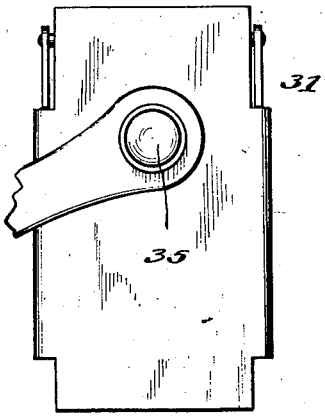
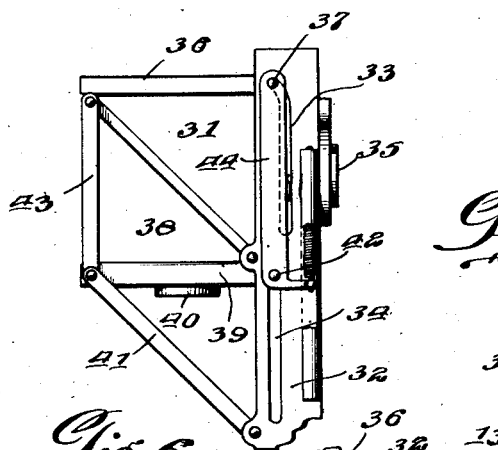
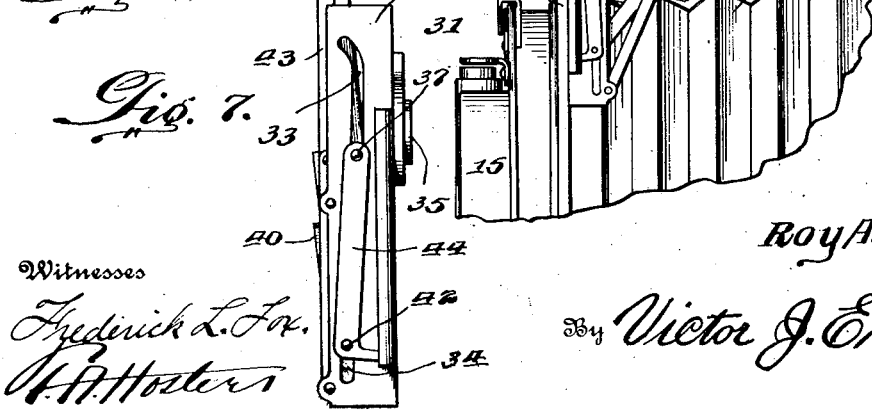
Inventor
Roy A. Helton
Witnesses
Frederick L. Fox
H. A. Hosters
By Victor J. Evans,
Attorney

UNITED STATES PATENT OFFICE.

ROY A. HELTON, OF LANSDOWNE, PENNSYLVANIA.

VIEW AND FOCUS FINDER.

1,177,622.  Specification of Letters Patent.  Patented Apr. 4, 1916.

Application filed January 9, 1915. Serial No. 1,438.

*To all whom it may concern:*

Be it known that I, ROY A. HELTON, a citizen of the United States, residing at Lansdowne, in the county of Delaware and State of Pennsylvania, have invented new and useful Improvements in View and Focus Finders, of which the following is a specification.

The invention relates to finders particularly adapted for use in connection with cameras, and has for an object to provide a finder which permits of readily and clearly determining the view to be photographed and which, furthermore, operating in conjunction with the lens of the camera, permits of readily obtaining the desired focus between the lens of the camera and the object to be photographed.

The invention contemplates, among other features, the provision of a finder which not only pictures the view to be photographed upon a ground or brilliant glass or surface in such a manner that the high and low lights can be readily and clearly seen and the image presented in its clearest aspect, but also permits of readily and quickly adjusting the usual lens board of the camera in order to obtain the desired focus or relation of distance between the lens, the sensitized surface upon which the view is to be photographed and the object or view which is to be photographed.

Still further objects of the invention reside in the provision of a finder such as mentioned which can be readily applied to a camera without interfering with the usual folding qualities of the camera, the camera, even though the device is applied thereto, being adapted to be operated in the usual manner if the operator does not desire or care to use the finder in its prescribed manner.

To this end use is made of a preferably transparent surface such as a ground or brilliant glass upon which, in the usual manner, is reflected an image of the view or object to be photographed, with additional means for reflecting another image of the same view or object from a different point of sight upon the same glass or surface until, through proper manipulation of face the finder, the two views reflected upon the ground or brilliant glass will register with each other and appear alike as a composite to the end that when the two views register as mentioned the finder, operating in conjunction with the lens of the camera, will indicate that the camera is in proper focus for the view to be photographed.

In the further disclosure of the invention reference is to be had to the accompanying drawings, constituting a part of this specification, in which similar characters of reference denote corresponding parts in all the views, and in which:

Figure 1 is a fragmentary perspective view of a camera showing the finder applied thereto and in operative position; Fig. 2 is a vertical longitudinal sectional view taken through the finder and the supplementary reflecting member; Fig. 3 is a vertical transverse sectional view taken through the finder proper; Fig. 4 is a diagrammatic view showing the manner in which the finder is operated; Fig. 5 is a front elevation of a modified form of finder proper; Fig. 6 is a side elevation thereof; Fig. 7 is a view similar to Fig. 6, showing the finder illustrated in Fig. 6 folded; and Fig. 8 is a fragmentary vertical sectional view showing a camera equipped with my finder partially closed.

Referring more particularly to the views, I disclose a camera 10 consisting of the usual box 11 having a bed 12 which is adapted to swing on the box and be folded thereon to form the front of the box when the bed is closed, the usual lens board 13 being provided and connected by means of the bellows 14 with the box 11, the lens board 13 being adapted to slide forwardly and backwardly on the bed 12 when the same is open or in horizontal position with respect to the box. It will of course be understood that the usual film or plate (not shown) is carried within the box and the usual lens which may be indicated by the numeral 15 is carried on the lens board and is adapted to be advanced with the lens board over the face of the board 12 in order that the desired relative distance between the film or plate and the lens and the lens and the object to be photographed can be obtained.

Carried on a projection or extension 16 of the lens board 13 is a finder body 17 in the nature of a substantially rectangular box 18 having a lens 19 in its front face and a lens 20 in its bottom or on the side, an inclined semi-transparent mirror or other suitable reflecting medium 21 being arranged within the box 18 at substantially an angle of forty-five degrees to the horizontal for the purpose of presenting upon a ground or brilliant transparent surface or glass 22, in the top of the box 10, any view which passes upwardly through the lens 20 or horizontally through the lens 19, the ground glass or other brilliant element 22 therefore providing a means for presenting to view upon a single member two optical images formed from different points of sight.

Mounted to swing on a lower extension 23 of the lens board 13 is a supplementary mirror or reflecting element 24 having its lower edge adapted to operate over a track or strip like element 25, the inner end of which is suitably secured to the bed 12, with the forward end projecting across a transverse adjusting member 26 on the bed 12 so that the inclination of the element 25 can be varied with respect to the bed, it being readily seen that the supplementary reflecting mirror 24 is inclined at an angle with respect to the element 25, the inclination of the supplementary mirror being substantially forty-five degrees from the horizontal. It will be further noted that the supplementary reflecting mirror is disposed immediately beneath and in vertical alinement with the bottom lens 20 in the finder body 17.

Referring now to the views it will be noted that as the lens board is advanced or retreated on the bed the inclination of the supplementary reflecting element 24 will be proportionately varied due to the inclination of the track or strip like element 25 which is adjusted in accordance with the focal length of the lens employed on the camera through the medium of the member 26, as mentioned heretofore. It will also be seen that as the lens board is advanced or retreated on the bed the supplementary reflecting mirror will be advanced or retreated with the lens board, as will also the finder body 17. Now it will be clear that the finder body possesses the usual qualities of the ordinary finders now generally used with cameras to the extent that it will, through the medium of the lens 19 and mirror 21, reflect on to the ground glass 22 a view or image coming within the field of view of the lens 19. It will also be clearly seen by referring to the diagrammatic view that a similar view to that which is reflected on to the ground glass through the front lens 19 by the mirror 21 will be received on the polished and reflecting surface of the supplementary mirror 24 and will be reflected by it at right angles into the bottom lens 20, thence through the mirror 21 which, being semitransparent, will allow the image to be brought to a focus on the ground glass 22. Therefore, the mirror 21 being of a semitransparent nature will allow of two images being reflected on to the ground glass and it will be clear that the superposition of one image upon the other will depend entirely upon the inclination of the mirror 24 which, if properly inclined, will bring the two images into registration in the nature of a composite picture. The shape of the curved track 25 is such that the vertical height from the base board 12 at any point is proportionate to the versed sine of the angle that must be assumed by the mirror 24 to send the ray of light from the image perpendicular into the lens 20. To determine the proper curvature of the track 25 the lens of the camera will be focused on the ground glass at hyperfocal distance, or the distance of infinity. At that point the track 25 should be so bowed or arched as to bring the two images on the screen 22 into coincidence. The camera is then focused on objects of decreasing distances, and in each position the track is bent into such a form that the images on the screen 22 coincide. The resulting form will give the proper fixed curvature for the track 25 in the continued use thereof with the camera. The proper curvature of the track 25 having been determined, it will be possible approximately to vary that curvature in such a way as to allow this device giving the proper focus when a supplementary or portrait lens is employed on the camera. For that purpose the adjusting member 26 is in the form of a cam which serves to raise or lower the track or trip element 25 when adjusted. To this end the track or element 25 is made adjustable for the purpose of varying its inclination with respect to the bed of the camera in accordance with the focal length of the lens employed in said camera. Therefore, the lens of the camera disposed in the lens board being of a strength and focusing power proportionate to the disposition of the finder body and supplementary reflecting mirror and the proportionate strength of the lenses carried by the former, it will be clearly apparent that as the lens board is advanced or retreated on the bed the motion of the lens with respect to the plate or film will at the same time result in obtaining a proper focus as to the object to be photographed and by having the inclination of the supplementary reflecting mirror 24 arranged as before mentioned in conjunction with the advancement or retraction of the lens board upon the bed of the camera, the lens of the lens board will be in focal relation to the film or plate and the object when the two images reflected on the ground glass register, as clearly set forth in the diagrammatic view.

Thus with a structure of the character described it is only necessary for the operator to carefully view the reflections on the ground glass and advance or retreat the lens board upon the bed of the camera until the reflections coincide or register and when this is accomplished the camera will be in focus with the object to be photographed.

From the foregoing description it will thus be seen that with the simple mechanism described an operator can readily secure the desired focus of a camera with respect to an object and that the focusing operation can be accurately carried out in a very short space of time, while at the same time the extent of the picture or view to be photographed will also be clearly apparent upon the ground glass which is made of a size to so correspond with the size of the plate or film that the operator can thereby readily determine how much of the picture or view will appear upon the plate or film.

As mentioned heretofore, the structure described is so arranged and constructed with respect to the box 11 and the bed 12 that when the lens board is retreated into the box with the bellows 14 for the purpose of permitting the folding of the camera to such an extent that the bed, when swung upwardly, will form the front of the box and close the same, the bed will in no wise interfere with the supplementary mirror or the finder body carried by the lens board. To this end there is provided at the rear extremity of the lens board an upstanding trip 27 which is adapted to be engaged by a depending element 28 on the underside of the supplementary mirror as the lens board is retreated into the box, thus swinging the supplementary mirror toward a horizontal position in which it will be firmly held so that when subsequently the lens board is again moved out on the bed, the supplementary mirror, pulled downwardly from its almost horizontal position by a spring 29, will have its depending element 28 engage the upstanding trip 27 to swing the mirror downwardly so that its lower edge will bear against and operate over the track or element 25.

It is well known that in cameras that are, when in normal position of greater height than width or in which the element or plate is longer one way than the other, it is ofttimes necessary in order to obtain a proper picture to swing the camera from its normal upright position with its longest portion extending vertically into a horizontal position, thus usually necessitating the swinging of the finder to a corresponding position on the camera. With my finder I avoid an adjustment of this kind of the finder body by providing an auxiliary reflecting element 30 pivoted to swing upon the finder body but so arranged that it will remain in the position in which it is swung; being, in other words, frictionally arranged to swing upon the finder body. Thus the element 30 can be swung to an angle with respect to the ground glass so that even though the ground glass is in a vertical position, due to the swinging of the camera into a horizontal position, the representation or view pictured upon the ground glass, will be reflected into the element 30 so that the operator, by simply looking down upon the element, can readily see the view of which a photograph is desired.

Referring to Figs. 5, 6 and 7, it will be seen that the finder body may be constructed to fold so as to take up less room when the lens board is moved into the box and the bed is swung up to close the front of the box. To this end the finder body, indicated by the numeral 31, consists of uprights 32 having longitudinal slots 33, 34, with a front lens 35 supported between the uprights 32 and rigid thereon, the usual ground glass 36 (although the same may also be a brilliant glass as mentioned heretofore) having projecting studs or pins 37 which are adapted to operate in the slots 33, the reflecting element 37′ in the nature of the semi-transparent mirror being indicated by the numeral 38 and resting upon a normally horizontal plate 39 carrying the bottom lens 40, with side braces 41 holding the plate 39 horizontal. The inner end of the plate 39 carries studs or pins 42 operating in the slots 34 and uprights 43 are pivoted at their lower ends to the plate 39 and at their upper ends to the ground glass 36, the upper end of the mirror 38 having suitable connection with the ground glass at the juncture of the uprights 43 therewith so that when the ground glass 36 has its forward end swung downwardly to advance the studs 37 in the slots 33, braces 44 connecting the sides 37 and 42 will cause a downward swinging of the front of the plate 39 so that the normally horizontal parts of the finder body will fold toward the front and lie adjacent to the uprights 32, a suitable spring 45 being provided to normally hold the movable parts of the finder body in open position.

From the foregoing description it will be seen that the device described is of a simple construction, consists of few parts and permits the easy operation of a camera for the purpose of determining quickly and effectually the desired focus between the film or plate and the object, with the usual photographic lens interposed. It will, of course, be understood that various slight changes may be made from the construction disclosed herein without departing from the spirit of the invention and that the scope thereof is defined by the appended claims.

Having thus described my invention, I claim:

1. The combination with a movable finder having a partially transparent element and lenses at substantially right angles to each other and coöperative with said element, of a track having a fixed curvilinear shape and adapted to be positioned below the path of travel of the finder, and a reflector element swingingly supported and movable with the finder and engageable with the said track for varying its angular disposition for coöperation with the finder to simultaneously obtain the extent of field and the focus.

2. The combination with a movable finder having a partially transparent element and lenses at substantially right angles to each other and coöperative with said element, of a track having a fixed curvilinear shape and adapted to be positioned below the path of travel of the finder, a reflector element swingingly supported and movable with the finder and engageable with the said track for varying its angular disposition for coöperation with the finder to simultaneously obtain the extent of field and the focus, and means acting directly on the reflector element to positively hold the same in engagement with the track throughout the extent thereof.

3. The combination with a movable finder having a partially transparent element and lenses at substantially right angles to each other and coöperative with said element, of a track having a fixed curvilinear shape and adapted to be positioned below the path of travel of the finder, a reflector element swingingly supported and movable with the finder and engageable with the said track for varying its angular disposition for coöperation with the finder to simultaneously obtain the extent of field and the focus, means acting directly on the reflector element to positively hold the same in engagement with the track throughout the extent thereof, and means operative upon the said track to vary the disposition thereof.

4. The combination with a movable finder having a partially transparent element and lenses at substantially right angles to each other and coöperative with said element, of a track having a fixed curvilinear shape and adapted to be positioned below the path of travel of the finder, a reflector element swingingly supported and movable with the finder and engageable with the said track for varying its angular disposition for coöperation with the finder to simultaneously obtain the extent of field and the focus, means acting directly on the reflector element to positively hold the same in engagement with the track throughout the extent thereof, means operative upon the said track to vary the disposition thereof, and means mounted directly on the finder to provide an auxiliary reflector element for viewing the images upon the screen of the finder when turned from normal position.

5. The combination with a finder including a pair of lenses at substantially right angles to each other, of a track bent to assume a fixed curvilinear shape, said finder and track being movable relative to each other, a semi-transparent mirror, a screen, and a reflector element engageable with the track for varying the angular disposition of said reflector element for directing an optical image into the field of view of one of the lenses of the finder for transmission through the semitransparent mirror, while the other lens coöperates to duplicate the optical image by reflection of the semitransparent mirror.

In testimony whereof I affix my signature in presence of two witnesses.

ROY A. HELTON.

Witnesses:
S. C. HILL,
F. A. HOSTER.